United States Patent
Niwa et al.

(10) Patent No.: US 6,306,033 B1
(45) Date of Patent: Oct. 23, 2001

(54) VIDEO GAME ITEM'S VALUE BEING ADJUSTED BY USING ANOTHER ITEM'S VALUE

(75) Inventors: Takayuki Niwa; Yasuo Kuwahara, both of Honolulu, HI (US)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/274,925

(22) Filed: Mar. 23, 1999

(51) Int. Cl.⁷ .................................................. A63F 13/00
(52) U.S. Cl. .................................. 463/1; 463/8; 463/31; 463/43
(58) Field of Search .......................... 463/43–45, 30–34, 463/36–39, 47.2, 47.3, 47.4, 49–54, 1, 7, 8, 9, 23, 24, 29

(56) References Cited

U.S. PATENT DOCUMENTS

| | | | |
|---|---|---|---|
| 5,390,937 | * | 2/1995 | Sakaguchi et al. .................... 463/44 |
| 5,649,861 | * | 7/1997 | Okano et al. ......................... 463/30 |
| 5,649,862 | * | 7/1997 | Sakaguchi et al. .................... 463/44 |
| 5,807,174 | * | 9/1998 | Fukuhara et al. ..................... 463/31 |

OTHER PUBLICATIONS

Robert Brady "Doom" Totally Unauthorized Tips and Secrets Brady Games pp. 1–4 and 22–57, Dec. 1994.*

* cited by examiner

*Primary Examiner*—Michael O'Neill
(74) *Attorney, Agent, or Firm*—Oblon, Spivak, McClelland, Maier & Neustadt, P.C.

(57) ABSTRACT

A memory area in a video game apparatus stores items owned by a character and item values corresponding to the items respectively. Fundamental data and up-date data which is copy of the fundamental data are stored as the item data. When an instruction of item "tune-up" is input through an input section, a control unit controls a display device to display a list of the items owned by the character. Of the listed items, a first item to be enhanced and a second item to be used for enhancing the first item are both designated. In response to the designation, the control unit reads item values of the designated first and second items from the memory for update. The control unit calculates a new item value of the first item based on the read item values, and the new item value is stored in the memory as up-date data.

20 Claims, 14 Drawing Sheets

FIG. 3

| TYPE | ITEM NAME | QUANTITY |
|---|---|---|
| WEAPONS | HANDGUN | 1 |
| | SHOTGUN | 1 |
| | MACHINEGUN | 0 |
| | RIFLE | 2 |
| | ⋮ | ⋮ |
| PROTECTIVE GEAR | PROTECTOR | 1 |
| | SUIT | 2 |
| | ARMOR | 0 |
| | ⋮ | ⋮ |
| OTHERS | CURE | 3 |
| | MEDICINE | 0 |
| | ADDITIONAL OFFENSIVE FORCE | 2 |
| | ADDITIONAL BULLETS | 4 |
| | ⋮ | ⋮ |

FIG. 4

| | | | PARAMETER TYPE | PARAMETER | COMPONENTS | | F |
| --- | --- | --- | --- | --- | --- | --- | --- |
| | | | | | FUNDA-MENTAL VALUE | ADJUST-MENT VALUE | |
| 231 — WEAPONS | HAND GUN | FUNDA-MENTAL DATA | OFFENSIVE FORCE | 12 | 12 | +0 | |
| | | | EFFECTIVE RANGE | 51 | 51 | +0 | |
| | | | INSTALLED BULLETS | 6 | 6 | +0 | |
| | | UP-DATE DATA | PARAMETER TYPE | PARAMETER | FUNDA-MENTAL VALUE | ADJUST-MENT VALUE | F |
| | | | OFFENSIVE FORCE | 15 | 12 | +3 | |
| | | | EFFECTIVE RANGE | 55 | 51 | +4 | 0 |
| | | | INSTALLED BULLETS | 6 | 6 | +0 | |
| | 235 | | ⋮ | | | | ⋮ |
| | SHOT GUN | FUNDA-MENTAL DATA | PARAMETER TYPE | PARAMETER | FUNDA-MENTAL VALUE | ADJUST-MENT VALUE | F |
| | | | OFFENSIVE FORCE | 49 | 48 | +1 | |
| | | | EFFECTIVE RANGE | 60 | 60 | +0 | |
| | | | INSTALLED BULLETS | 7 | 4 | +3 | |
| | | | ⋮ | | | | ⋮ |
| 232 — PROTEC-TIVE GEAR | PROTEC-TOR | FUNDA-MENTAL DATA | PARAMETER TYPE | PARAMETER | FUNDA-MENTAL VALUE | ADJUST-MENT VALUE | F |
| | | | DEFENSIVE FORCE | 12 | 11 | +1 | |
| | | | ESCAPE ABILITY | 9 | 9 | +0 | |
| | | | DURABILITY | 18 | 16 | +2 | |
| | | UP-DATE DATA | PARAMETER TYPE | PARAMETER | FUNDA-MENTAL VALUE | ADJUST-MENT VALUE | F |
| | | | DEFENSIVE FORCE | 12 | 11 | +1 | |
| | | | ESCAPE ABILITY | 9 | 9 | +0 | 0 |
| | | | DURABILITY | 18 | 16 | +2 | |
| | | | ⋮ | | | | ⋮ |

FIG. 11

TO-BE-ENHANCED ITEM

HANDGUN

| PARAMETER TYPE | PARAMETER | FUNDAMENTAL VALUE | ADJUSTMENT VALUE |
|---|---|---|---|
| OFFENSIVE FORCE | 15 | 12 | +3 |
| EFFECTIVE RANGE | 57 | 51 | +6 |
| INSTALLED BULLETS | 11 | 6 | +5 |

POWER SUPPLIER ITEM

RIFLE

| PARAMETER TYPE | PARAMETER | FUNDAMENTAL VALUE | ADJUSTMENT VALUE |
|---|---|---|---|
| OFFENSIVE FORCE | 43 | 43 | +0 |
| EFFECTIVE RANGE | 52 | 52 | +0 |
| INSTALLED BULLETS | 18 | 18 | +0 |

VIDEO GAME ITEM'S VALUE BEING ADJUSTED BY USING ANOTHER ITEM'S VALUE

BACKGROUND OF THE INVENTION

1. Field of the Invention

The present invention relates to a technique for improving the effects of items used by characters in a video game executed by a video game apparatus.

2. Description of the Related Art

A video game apparatus can execute various types of games. One such game presents fighting scenes where a player character, which is controlled by a player, fights with many enemy characters.

In such fighting scenes, the player character and an enemy character alternately perform offensive/defensive moves against each other, and the first character which cause the other to lose all of his stamina (life force) wins. The characters use the items to attack other characters and use protective gear for defense.

During the game play, the player can obtain a number of items which may be owned by his player character. Various types of the items are prepared in the game, and each item has its own effect. The player plays the game with controlling his player character to use offensive items for attacking the enemy characters and to use protective gear items for defending himself from the enemy's attack. Thus, the various items provided bring the player more fun in playing because he will have various optional items during the course of the game.

If the items are customizable by the player, the game will be a more enjoyable and dramatic one because the items are influential factors which cause the game to have more variation because the player can obtain various types of items. Preparing various ways of customizing the items also realizes the same effect.

SUMMARY OF THE INVENTION

It is an object of the present invention to provide a video game which permits a player to customize items used by a player character during game play.

To accomplish the above object, a video game apparatus according to a first aspect of the present invention is a video game apparatus for executing a video game in which a character which can own a plurality of items having influences upon game progress is prepared, the video game apparatus comprises:

copy means for copying the plurality of items owned by the character and item values thereof from first storage means storing plurality of items and item values each of which is previously set to the corresponding item to second storage means;

designation means for designating first item and second item from the plurality of items stored in the second storage means in accordance with an input instruction;

calculation means for reading item values of the first and second items designated by the designation means from the second storage means, and for executing calculation using the read item values; and update means for updating the item value of the first item stored in the second storage means utilizing a resultant value of the calculation executed by the calculation means.

According to the present invention, an item value of an item can be modified (adjusted) by utilizing another item's value. That is, the player can customize the items that have major influence upon the game progress.

During the game play, the character may obtain a plurality of the same item even if one of them has already been customized. In this case, it is preferred that an item value of a later obtained item is the same as the original item value of the item concerned. In the present invention, the items and item values corresponding to the items respectively are previously stored in the first storage means. Every time the character obtains an item, the item value corresponding to the obtained item is copied to the second storage area for updating. Therefore, the original item data remain as is even if the item value of the obtained item is updated.

The above described video game apparatus may further comprise means for influencing the game progress in the case of the character is instructed by an input command to use the item whose degree of influence corresponds to the item value of the item concerned stored in the second storage means. This makes the game more enjoyable.

The above described item value, for example, may comprise a fundamental value and an adjustment value for adjusting the fundamental value. In this case, the above described calculation means may read adjustment values of the first and second items from the second storage means, and may execute the calculation using the read adjustment values. The adjustment value of the first item may be replaced with a resultant value of the calculation.

For example, the sum of the fundamental value and the adjustment value represents the item value. In this case, the calculation means reads the adjustment values of the first and second items from the second storage means, and adds the read adjustment values to each other.

The above described video game apparatus may further comprise means for deleting a combination of the second item and the item value thereof from a plurality of combinations of the items and item values thereof stored in the second storage means in the case of the item value of the first item is updated by the update means.

A video game apparatus according to a second aspect of the present invention is a video game apparatus for executing a video game in which a character which can own a plurality of items having influences upon game progress is prepared, the video game apparatus comprises:

means for displaying objects representing first item and second item designated by an input instruction from the plurality of items owned by the character, and displaying item values corresponding to the designated first and second items;

means for adding the displayed item values corresponding to the first and second items to each other, and for replacing the item value of the first item by a resultant value of the addition; and means for displaying only the object representing the first item and the item value thereof in the case of the item value of the first item is replaced.

According to this structure, the player is impressed as if the power of the second item is absorbed in the first item and then the second item disappears.

A video game apparatus according to a third aspect of the present invention is a video game apparatus comprising a storage device and a processing device for executing a video game in which a character which can own a plurality of items having influences upon game progress is prepared, wherein the storage device comprises a first memory area for storing a plurality of items and item values thereof each of which is previously set to the corresponding item, in addition to programs for controlling the game progress, and second memory area for storing the plurality of items owned by the character and the item values thereof which are copied from the first memory area, and the processing device (1) controls the game progress in accordance with the programs stored in the storage means and input instructions, and exerts influences upon the game progress in the case of the character is instructed by an input command to use the item whose degree of influence depends on the item value corresponding to the item concerned stored in the second storage area of the storage device, and (2) reads item values corresponding to two items of the plurality of items stored in the second memory area of the storage device in accordance with a predetermined operation, modifies one of the read item values based on the other item value, and stores the modified value in the second memory area as a new item value of the item.

A method according to a fourth embodiment of the present invention is a method of executing a video game wherein a character which can own a plurality of items having influences upon game progress is prepared, the method comprises:

copy step of copying the plurality of items owned by the character and item values thereof from a first memory area storing a plurality of items and item values each of which is previously set to the corresponding item to a second memory area;

designation step of designating a first item and a second item from the plurality of items stored in the second memory area in accordance with an input instruction;

calculation step of reading item values of the first and second items designated by the designation step from the second memory area, and executing calculation using the read item values; and update step of updating the item value of the first item stored in the second memory area using a resultant value of the calculation executed by the calculation step.

The above described method may further comprise the step of exerting influence upon the game progress in the case of the character is instructed by an input command to use the item whose degree of the influence depends on the item value corresponding to the item concerned stored in the second memory area.

For example, the above described item value may comprise a fundamental value and an adjustment value for adjusting the fundamental value. The adjustment values of the first and second items may be read from the second memory area in the calculation step and the calculation is executed using the read adjustment values. The adjustment value of the first item may be replaced with a resultant value of the calculation.

The above described method may further comprise the step of deleting a combination of the second item and the item value thereof from a plurality of combinations of the items and the item values thereof stored in the second memory area in the case of the item value of the first item is replaced in the update step.

A method according to a fifth aspect of the present invention is a method of executing a video game wherein a character which can own a plurality of items having influences upon game progress is prepared, the method comprising the steps of:

displaying objects representing first item and second item designated by an input instruction from the plurality of items owned by the character, and displaying item values of the designated first and second items;

adding the displayed item values corresponding to the first and second items to each other, and for replacing the item value of the first item by a resultant value of the addition; and displaying only the object representing the first item and the item value thereof in the case of the item value of the first item is replaced.

A video game oriented apparatus or a general purpose computer which executes the method of executing the video game comprising the above steps will accomplish additional effects as well as the above described video game apparatus do.

A storage medium according to a sixth aspect of the present invention is a computer readable storage medium storing a program for causing a computer to execute a video game in which a character which can own a plurality of items having influences upon game progress is prepared, the program comprising:

copy step of copying the plurality of items owned by the character and item values thereof from a first memory area storing a plurality of items and item values each of which is previously set to the corresponding item to a second memory area;

designation step of designating a first item and a second item of the plurality of items stored in the second memory area in accordance with an input instruction;

a calculation step of reading item values of the first and second items designated by the designation step from the second memory area, and executing calculation using the read item values; and update step of updating the item value of the first item stored in the second memory area using a resultant value of the calculation executed by the calculation step.

The above described program may further comprise the step of exerting influence upon the game progress in the case of the character is instructed by an input command to use the item whose degree of the influence depends on the item value corresponding to the instructed item stored in the second memory area.

In the above storage medium, for example, the item value may comprise a fundamental value and an adjustment value for adjusting the fundamental value. In this case, the adjustment values of the first and second items may be read from the second memory area in the calculation step, and the calculation may be executed using the read adjustment values The adjustment value of the first item may be replaced with a resultant value of the calculation.

In the above storage medium, for example, the sum of the fundamental value and the adjustment value may represent the item value. In this case, the adjustment values of the first and second items from the second storage means may be read in the calculation step, and the read adjustment values may be added to each other.

In the above described storage medium, the program may further comprise the step of deleting a combination of the second item and the item value thereof from a plurality of combinations of the items and the item values thereof stored in the second memory area in the case of the item value of the first item is replaced in the update step.

A storage medium according to a seventh aspect of the present invention is a computer readable storage medium storing a program for causing a computer to execute a video game in which a character which can own a plurality of items having influences upon game progress is prepared, the program comprises the steps of:

displaying objects representing first item and second item designated by an input instruction from the plurality of items owned by the character and item values of the designated first and second items;

adding the displayed item values corresponding to the first and second items to each other, and for replacing the item value of the first item by a resultant value of the addition; and displaying only the object representing the first item and the item value thereof in the case of the item value of the first item is replaced.

A computer which reads the program having the above steps from the storage medium will realize the above described video game apparatus. That is, the program for realizing the present invention can be distributed or merchandised easily as a packaged software product separated from the device.

A computer data signal according to an eighth aspect of the present invention is a computer data signal embodied in a carrier wave for causing a computer to execute a video game in which a character which can own a plurality of items having influences upon game progress is prepared, the computer data signal comprising:

copy step of copying the plurality of items owned by the character and item values thereof from a first memory area storing a plurality of items and item values each of which is previously set to the corresponding item to a second memory area;

designation step of designating a first item and a second item from the plurality of items stored in the second memory area in accordance with an input instruction;

calculation step of reading item values of the first and second items designated by the designation step from the second memory area, and executing calculation using the read item values; and update step of updating the item value of the first item stored in the second memory area using a resultant value of the calculation executed by the calculation step.

A computer data signal according to a ninth aspect of the present invention is a computer data signal embodied in a carrier wave for causing a computer to execute a video game in which a character which can own a plurality of items is prepared, the computer data signal comprising the steps of:

displaying objects representing first item and second item designated by an input instruction from the plurality of items owned by the character and item values of the designated first and second items;

adding the displayed item values corresponding to the first and second items to each other, and for replacing the item value of the first item by a resultant value of the addition; and displaying only the object representing the first item and the item value thereof in the case of the item value of the first item is replaced.

A computer which executes the program comprising the above steps included in the computer data signal which is embodied in the carrier wave will realize the above described video game apparatus. Accordingly, the program for realizing the present invention can be distributed or merchandised by the computer data signal embodied in the carrier wave.

The advantages and other merits of the present invention will become more fully understood from the preferred embodiments, the claims and the drawings, a brief description of which is presented below.

BRIEF DESCRIPTION OF THE DRAWINGS

FIG. 3 is a diagram showing an item owned table shown in FIG. 2;

FIG. 4 is a diagram showing a weapon/protective gear table shown in FIG. 2;

FIGS. 9 to 12 are diagrams exemplifying display screens for explaining the process of item "tuning-up";

DETAILED DESCRIPTION OF THE PREFERRED EMBODIMENTS

An embodiment of the present invention will now be described with reference to the accompanying drawings. In the following embodiment, a case where the present invention is employed in a home video game apparatus will be described.

Figure 1:
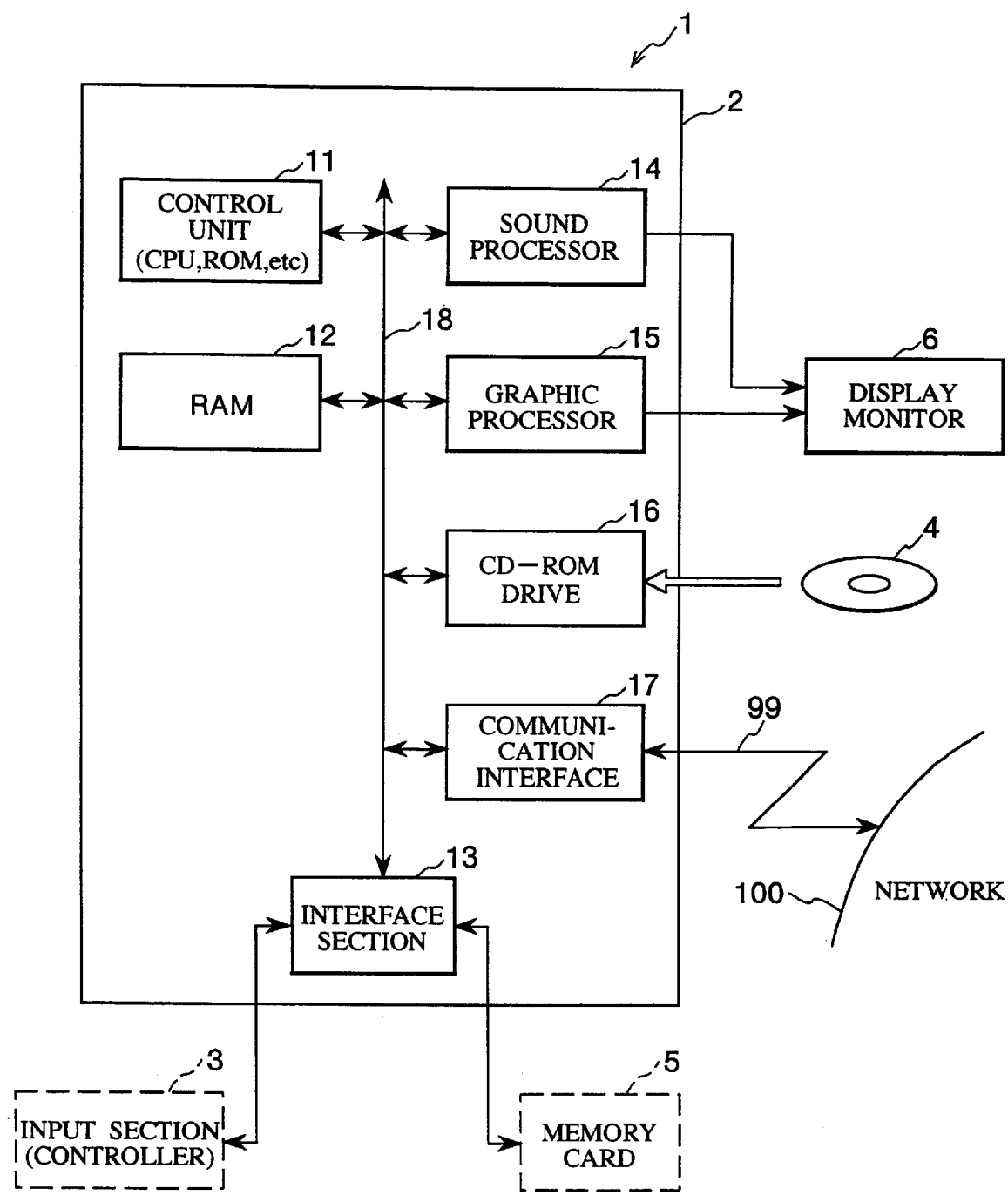
FIG. 1 is a block diagram showing the structure of a video game apparatus to an embodiment of the present invention.

FIG. 1 is a block diagram demonstrating the structure of the video game apparatus according to one embodiment of the present invention. As illustrated, a video game apparatus 1 comprises a video game apparatus main body 2, an input section 3, a memory card 5, a CD-ROM (Compact Disc Read Only Memory) 4, and a display monitor 6, for example.

The video game apparatus main body 2 comprises a control unit 11, a RAM (Random Access Memory) 12, an interface section 13, a sound processor 14, a graphic processor 15, a CD-ROM drive 16, and a communication interface 17, for example. And those are interconnected by a bus 18.

The control unit 11 includes a CPU (Central Processing Unit), a ROM (Read Only Memory) storing essential programs such as a boot program and an OS (Operating System), and the like. The control unit 11 executes programs in the RAM 12 for executing the game. The control unit 11 also controls all components 12 to 17 in the video game apparatus main body 2.

The RAM 12 works as a main memory of the video game apparatus main body 2, that is, it stores the programs and data essential for the game execution. Such programs and data are transferred to the RAM 12 from the CD-ROM 4. The RAM 12 also works as a work area for the program execution. Detailed descriptions of areas assigned to the RAM 12 and data in the areas will be described later.

The interface section 13 interconnects the bus 18 and external devices, that is, the input section 3 and the memory card 5, and controls data transfer therebetween. The input section 3 comprises directional keys and other various buttons. Those keys and buttons are prepared to input the player's instructions for controlling movements and actions of a player character in the game. The memory card 5 saves data representing game position.

The sound processor 14 is prepared for sound data playback. The sound data represent background music (BGM)

tunes and sound effects corresponding to various scenes in the game. The sound processor 14 playbacks the sound data in accordance with instructions from the control unit 11, and outputs audio signals to the display monitor 6.

The graphic processor 15 is prepared for 3D graphic processing. It generates image data representing images corresponding to various scenes in the game. The graphic processor 15 prepares video signals containing the generated image data and predetermined sync signals affixed thereto, and outputs the video signals to the display monitor 6.

The CD-ROM drive 16 drives the CD-ROM 4 inserted in the game apparatus main body 2 to transfer the stored programs and data to the RAM 12 via the bus 18.

The communication interface 17 interconnects the game apparatus main body 2 and an external network 100 via a communication cable 99. The control unit 11 controls the communication interface 17 to transmit/receive data or programs to/from the external network 1200.

The CD-ROM 4 contains programs and data necessary for the game execution. The CD-ROM drive 16 reads the programs and data from the CD-ROM 4 and transfers the read programs and data to the RAM 12 via the bus 18.

The display monitor 6 comprises a display screen and speakers The display screen may be a CRT (Cathode Ray Tube) display or the like for displaying images represented by the video signals from the graphic processor 15. The speakers output sounds represented by the audio signals from the sound processor 14. Generally, an NTSC television monitor may be used as the display monitor 6.

Areas assigned to the RAM 12 shown in FIG. 1 and data stored in the areas will now be described in detail.

Figure 2:
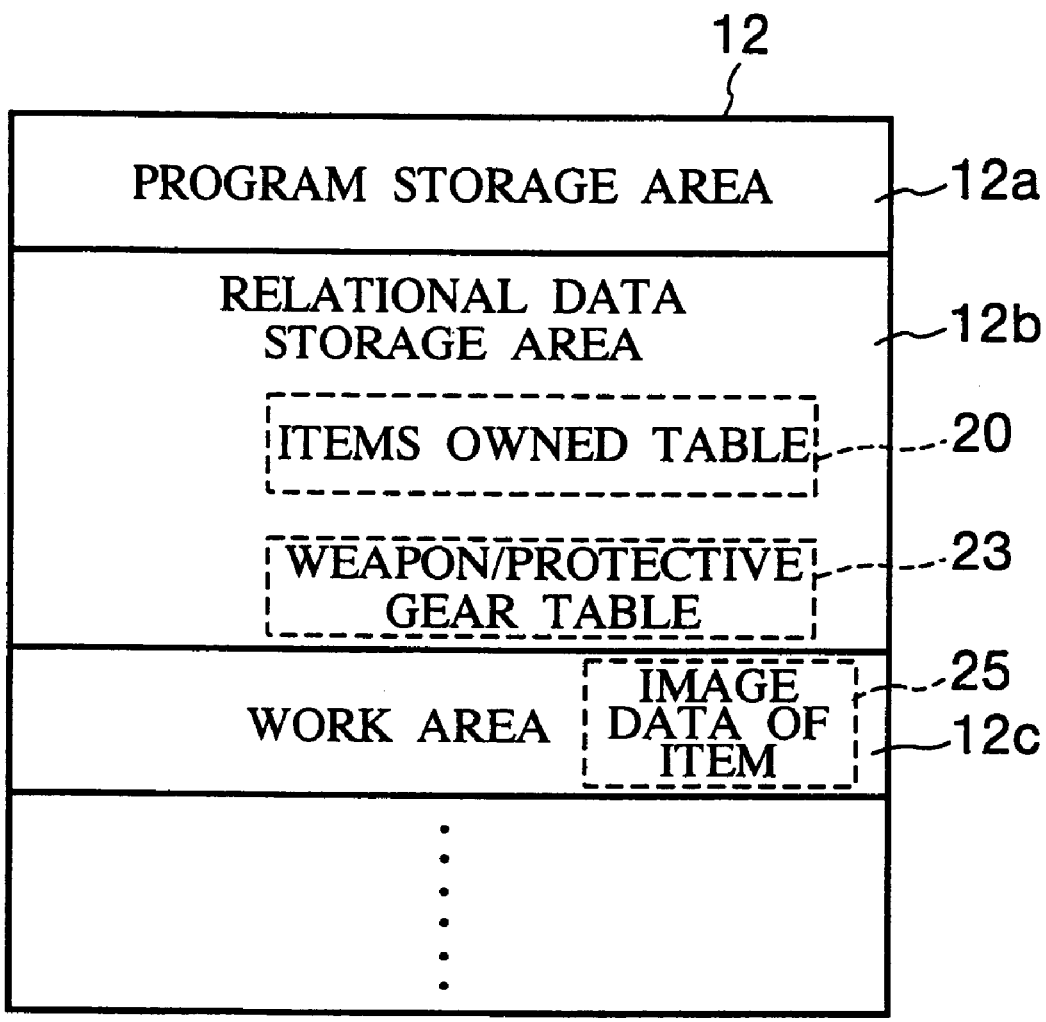
FIG. 2 is a diagram showing areas assigned to a RAM shown in FIG. 1.

FIG. 2 is a diagram showing the areas assigned to the RAM 12. As illustrated, a program area 12a, a relational data area 12b, and a work area 12c are assigned to the RAM 12. Programs and data to be transferred to those areas 12a to 12c are stored in the CD-ROM 4. The control unit 11 controls the CD-ROM drive 16 to read those programs and data from the CD-ROM 4 at predetermined times such as booting up the game, and transfers the read programs and data to the RAM 12.

The program area 12a stores the programs necessary for the game execution. The program to be stored in the program area 12a will be exemplified later with reference to a flowchart.

The relational data area 12b has an items owned table 20 and a weapon/protective gear table 23, and stores data relating to items obtained by a player character during the game play.

FIG. 3 is a diagram showing the items owned table 20 stored in the relational data area 12b. As illustrated, the items owned table 20 consists of a column 201 for storing "Item Type", a column 202 for storing "Item Name" and a column 203 for storing "Quantity".

"Type" column 201 indicates categorized items available during the game, such as: "Weapons" category 205 used by the player character to attack enemy characters; "Protective Gear" category 206 used by the player character to defend himself from the enemy's attack; and "Others" category 207 including medicine for restoring the player character's stamina (life force) when it is exhausted, items for improving the other items, and the like.

"Item Name" column 202 indicates names of all items available during the game play. The names are categorized in a list. In FIG. 2, weapons exemplified are "Handgun" 208, "Shotgun" 209 and the like, and protective gear exemplified include: "Protector" 210, "Suit" 211 and the like. Exemplified items in "Others" category are "Cure" item 212, "Medicine" item 213, "Additional Offensive Force" item 214, "Additional Bullets" item 215 and the like. The "Additional Offensive Force" item 214 is an item specialized for improving weapon power. The "Additional Bullets" item 215 is an item specialized for increasing the number of bullets installed in guns, rifles and the like.

"Quantity" column 203 indicates items owned by the player character and the number of each item. "0" in the "Quantity" column 203 indicates that the item concerned is not owned by the player character. The other numbers in the "Quantity" column 203 indicate the number of the items concerned. After the player character obtains a new item during the game play, the indicated number of the newly obtained item is incremented by one. On the contrary, after the player character loses an item, the indicated number of the lost item is decreased by one.

FIG. 4 is a diagram exemplifying the weapon/protective gear table 23 stored in the relational data area 12b. As shown in FIG. 4, the weapon/protective gear table 23 stores item data of the items only in "Weapons" 231 and "Protective Gear" 232 categories. Each item 233 (handgun, shotgun, protector, . . . ) has its own item data.

The item data of each item consist of "Fundamental Data" category 234 and "Up-date Data" category 235. "Fundamental Data" category 234 represents initial data of the items, that is, data preset to the item before it is owned by the player character. "Up-date Data" category represents copied fundamental data, that is, the fundamental data are copied to the up-date data when the player character obtains the item concerned. The up-date data are modified by a "tuning-up" processing which will be describe later.

The "Fundamental Data" category 234 includes a column 236 for storing "Parameter Type", a column 237 for storing "Parameter", a column 238 for storing "Fundamental Value", a column 239 for storing "Adjustment Value", and a column 240 for storing "Active Item Flag F". The "Parameter Type" column 236 indicates types of parameters assigned to the items. Prepared parameter types are "Offensive Force", "Effective Range" and "Bullets" in the weapons category 236, and "Defensive Force", "Escape Ability", and "Durability" in the protective gear category 232. The parameter 237 represents item values prepared item by item for each item type. As the parameter varies, the game situation varies. For example, how much the enemy character receives damage by the player-character's attack with the item depends on the item's offensive force parameter. Effective range and hitting capability of the item (weapon) vary in accordance with the item's effective range parameter. The number of bullets installed in the item (weapon) varies in accordance with the item's "bullets" parameter.

The player character's defensive force or ability of escape from the enemies' attacks during the fighting scene mode varies in accordance with the defensive force parameter and the escape ability parameter assigned to items categorized in the protective gear category 232. The durability parameter influences the durability of the player character against the enemies' attacks.

Each parameter 237 is the sum of the corresponding fundamental value 238 and the adjustment value 239. Each parameter type has its own fundamental value 238. Each of the fundamental values 237 are modified (adjusted, corrected) based on its accompanying adjustment value 239. The active item flag F indicates whether the player character is equipped with the item(s) concerned (set flag indicates that the item concerned is active). Note that the fundamental data do not need flag indication because it is data to be transferred.

The transferred fundamental data are set as the up-date data 235, therefore, the data structure and contents therein are basically the same as those of the fundamental data 234. However, the adjustment value 239, which is one component of the parameter value 237, varies in the "tuning-up" process, which will be described later. When the up-date data are generated (that is, the fundamental data is transferred to the up-date data), the active item flag F indicates "0" which represents that the player character is not equipped with the item. The active item flag F will be set to "1" after the item concerned is switched to active.

Accordingly, the fundamental data segments of the items available during the game play are previously registered in the weapon/protective gear table 23 as shown in FIG. 4. Since the fundamental data of the item concerned are transferred to the up-date data when the player character obtains the item, the fundamental data will be available when the player character obtains the same item later.

The work area 12c shown in FIG. 2 sequentially stores image data (for example, image data 25 representing the items), sound data, and the like which are necessary materials for the game execution.

The item "tuning-up" (enhancement) processing, which is executed by the control unit 11 in the video game apparatus 1 according to the embodiment, will now be described.

The player character obtains a number of items during the game play. Note that the items are influential factors in the game. As mentioned before, the items may be weapons (including magic etc.), protective gear, medicine, and the like. The player character uses those items to attack the enemy characters, defend himself from the enemies' attacks, recover his exhausted stamina (life force), and the like.

Process flow when the player character obtains the items will now be described with reference to FIG. 5.

When the player character obtains the item as a winner's bonus, a gleaned one, a bought one or the like, data relating to the obtained item are registered in the work area 12c in the RAM 12.

Figure 5:
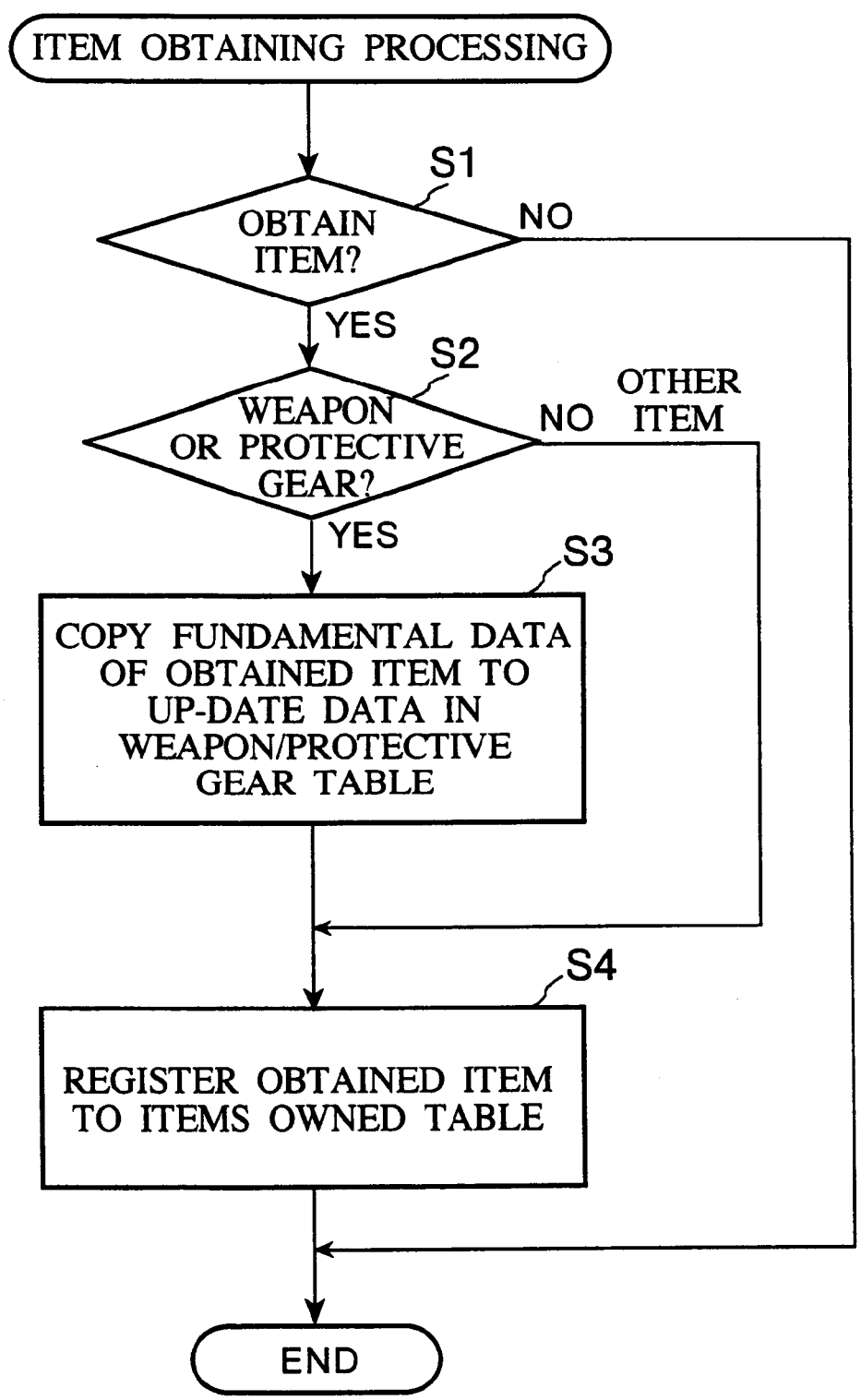
FIG. 5 is a flowchart for explaining item obtaining processing.

The control unit 11 constantly executes the item obtaining process shown in FIG. 5 in accordance with timer interruption. In the beginning, the control unit 11 refers to a predetermined area in the work area 12c to determine whether data relating to a newly obtained item are registered therein (step S1). That is, the control unit 11 determines whether the player character obtains a new item or not. If there are no newly registered data in the work area 12c (i.e. no item obtained), the process is terminated.

On the contrary, if data are found in the work area 12c (i.e. item newly obtained), the data are referred to in order to identify the type of the obtained item, including: weapons, protective gear, or other items (step S2).

In the case of the identified type of the obtained item is a weapon or protective gear, the fundamental data of the obtained item are copied to the up-date data category in the weapon/protective gear table 23 shown in FIG. 4 (step S3). In this case, an extra area is available if necessary. After the data are copied, the active item flag F is reset to 0 to indicate the Item concerned is now inactive.

For example, if the player character obtains three sets of the same item, three sets of the up-date data are generated.

If the identified type of the obtained item is an item other than a weapon or protective gear (i.e. an item categorized in the other item) in step S2 or after the processing in step S3 is completed, the number of the obtained item is added to a value in the quantity column 203 in the items owned table 20 (step S4).

Then, the item obtaining process is completed after unnecessary data in the work area 12c regarding to the obtained item is deleted.

This item obtaining process shown in FIG. 5 may be invoked in response to an event where the player character obtains an item.

According to this embodiment, the player can enhance power of one desired item by utilizing another item. That is, the player selects two items from the items owned by the player character at any timing, and then the adjustment value in the parameter of one of the selected items is added to the adjustment value in the parameters of another selected item. Thus, the power of the item to which the value is added is enhanced (tuned up).

Process flows when enhancing the item power will now be described with reference to FIGS. 6 to 12.

First of all, the player operates predetermined buttons or keys on the input section 3 to "tune up" the item while playing the game.

Figure 6:
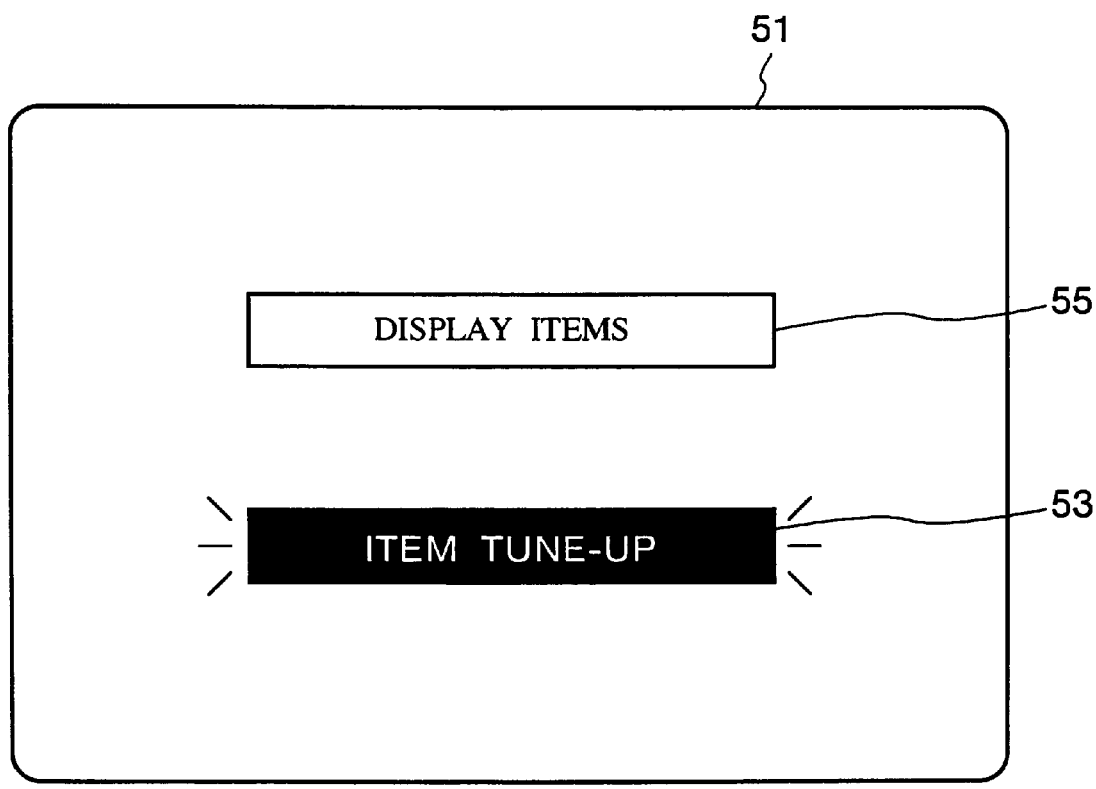
FIG. 6 is a diagram exemplifying a menu screen.

In response to the player's operation, running of the game stops under control of the control unit 11, and the display monitor 6 displays a menu screen 51 as shown in FIG. 6.

The player may move a cursor to select "ITEM TUNING UP" 53 through the menu screen.

Figure 7:
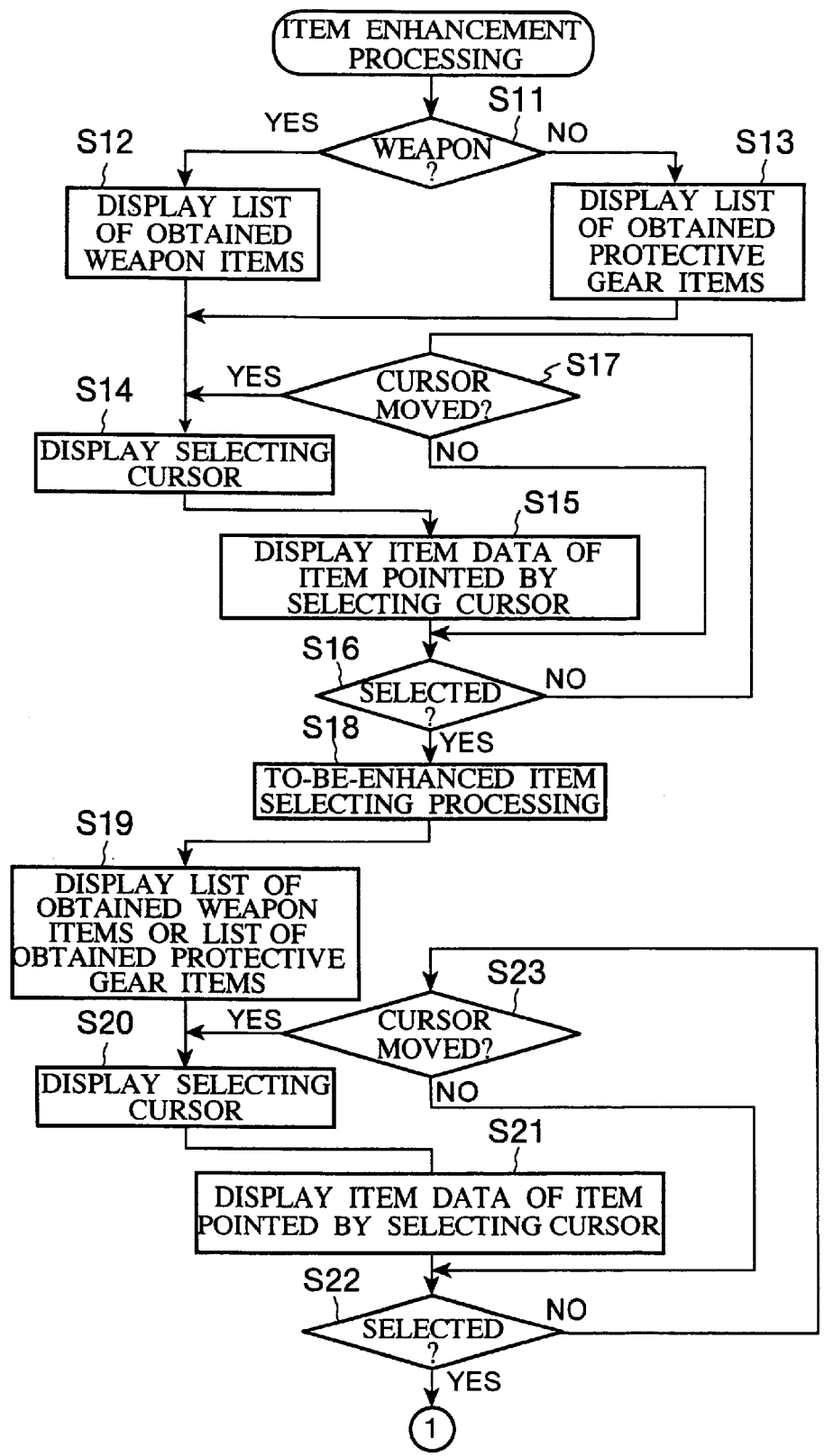
FIGS. 7 and 8 are flowcharts for explaining item "tuning-up" processing.
Figure 8:
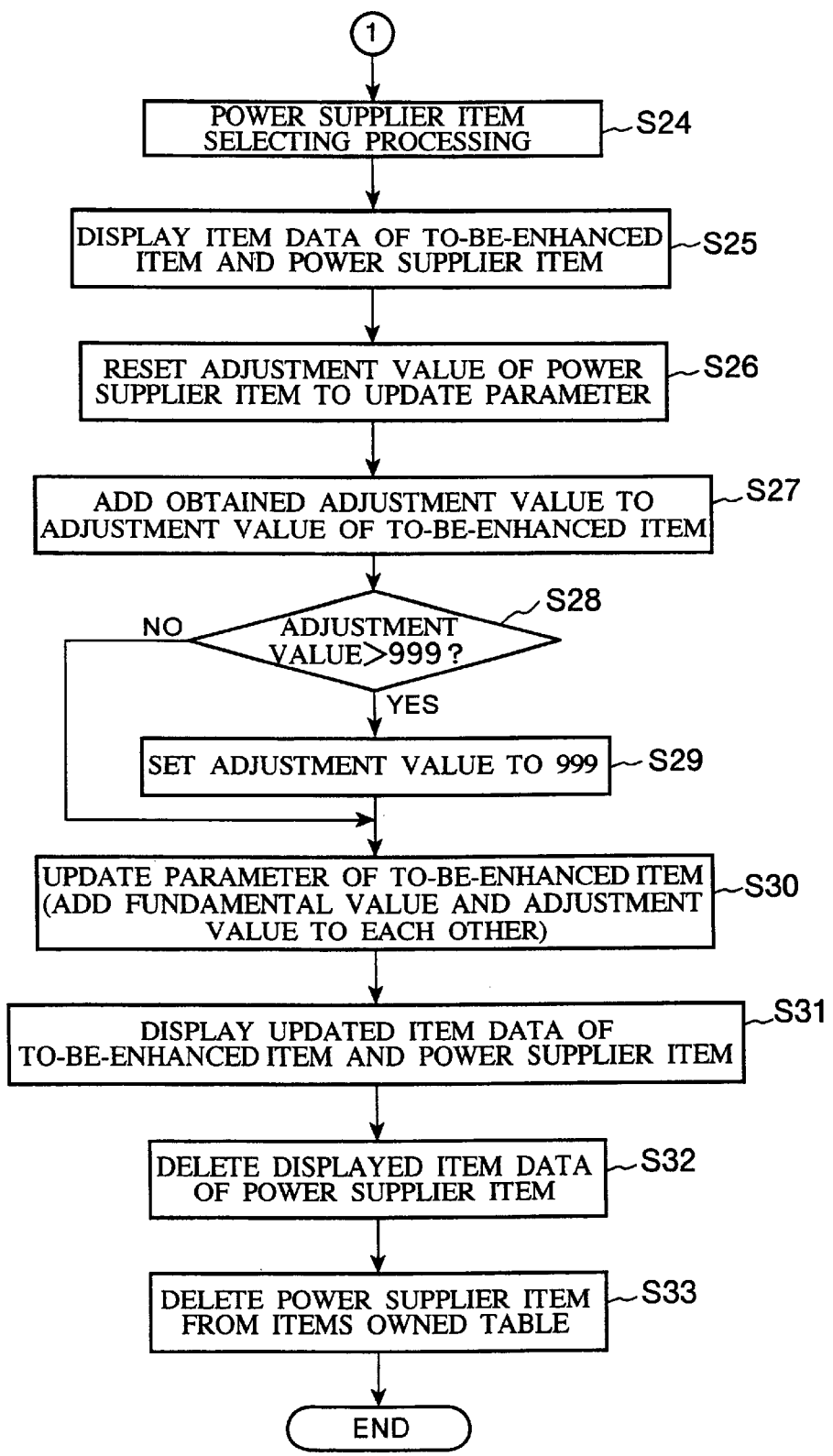

In response to the player's selection, the control unit 11 executes the item enhancement processing indicated by flowcharts shown in FIGS. 7 and 8.

The control unit 11 controls the display monitor 6 via the graphic processor 15 to display a dialog box for asking the player his preference, that is, whether the item category to be enhanced is weapon or protective gear (step S11).

If the player selects "WEAPON" by operating the input section 3, the control unit 11 seeks items categorized in the "WEAPON" column 205 in the item owned table 20 shown in FIG. 3 and selects the items whose quantity 203 is equal to or greater than 1 (i.e. the weapons owned by the player character). The control unit 11 prepares a list of the selected items and the display monitor 6 displays the list on an item list display area 61 in the display area 60 as shown in FIG. 9 (step S12).

If the "PROTECTIVE GEAR" is selected in step S11, the control unit 11 seeks items categorized in the "PROTECTIVE GEAR" column 205 in the items owned table 20 shown in FIG. 3 and selects the items whose quantity 203 is equal to or greater than 1 (i.e. the protective gear owned by the player character), and the selected protective gear items are listed (step S13).

Then a selecting cursor 70 is displayed on the weapon list or on the protective gear list (step S14).

Figure 9:
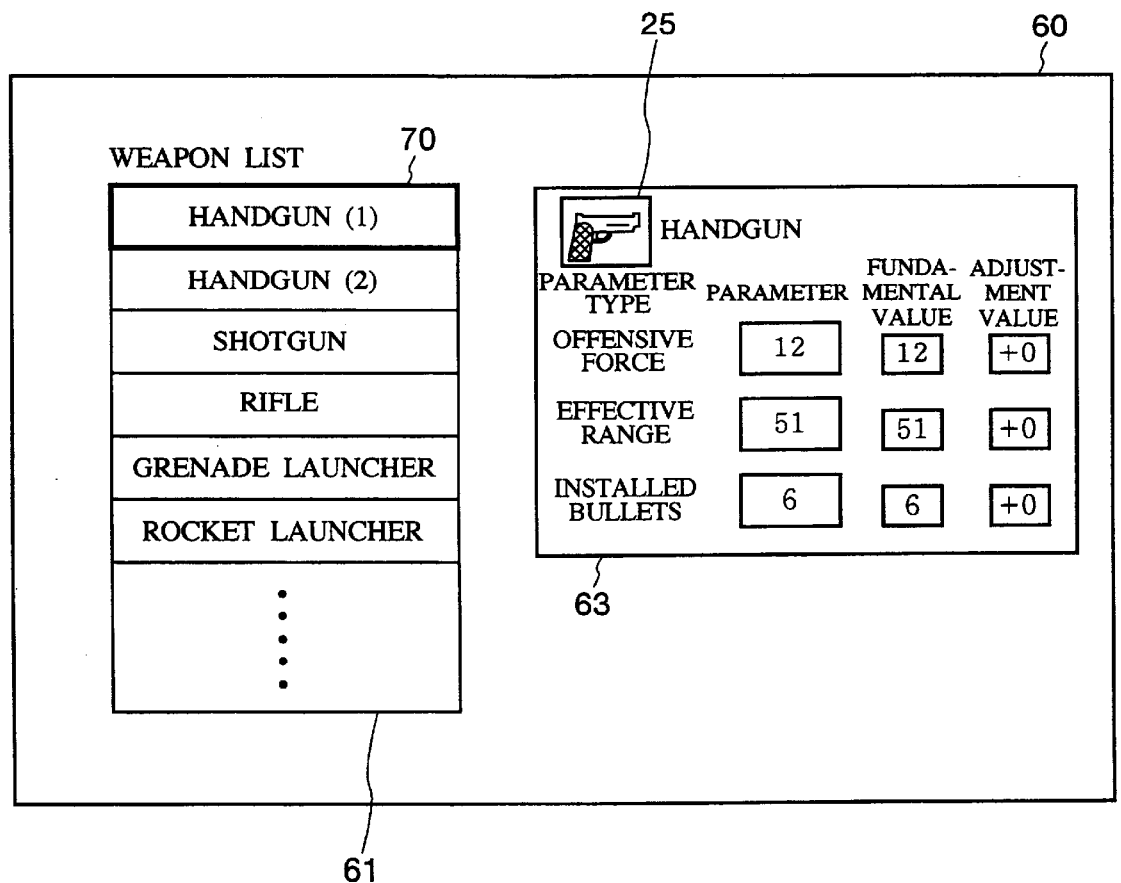

The control unit 11 reads the up-date data indicating item data (item type, parameter, fundamental value, and adjustment value) corresponding to the item pointed by the selecting cursor 70 from the weapon/protective gear table 23 shown in FIG. 4, and the read data are displayed in an item data display area 62 as shown in FIG. 9 (step S15). Image data 25 representing the pointed item is also read from the work area 12c and the read image data are displayed with the up-date data.

FIG. 9 exemplifies that two "handguns" are owed by the player character. Therefore, the weapon/protective gear table 23 has two sets of the up-date data for the handgun. Since the handgun (1) is pointed by the selecting cursor 70, the control unit 11 reads the up-date data corresponding to the handgun (1) from the weapon/protective gear table 23, and the read data is displayed in the item data display area 62.

The control unit 11 determines whether the item pointed by the selecting cursor 70 is selected (entered) as a to-be-enhanced item or not (step S16).

In the case of the control unit 11 determines that the item is not selected, it further determines whether an instruction to move the selecting cursor 70 is input or not (step S17). If the instruction is not input, the flow goes to step S16. If the control unit 11 determines that the instruction to move the selecting cursor 70 is input, the flow goes to step S14 to move the selecting cursor 70 (step S14), and the control unit 11 reads the item data corresponding to the item pointed by the moved selecting cursor 70 to display it (step S15).

When the player controls the selecting cursor 70 so as to point to a desired item in the list and press an enter button, this key operation is detected by step S16 and then the item pointed by the cursor is selected as the to-be-enhanced item.

The control unit 11 stores the item data of the selected item to the work area 12c (step S18).

Then the control unit 11 prepares a list of the weapons or protective gear in accordance with the selection in step S11, and the list is displayed in order to ask the player which item is used as a power supplier item (step S19).

Further the selecting cursor 70 is displayed (step S20), and the control unit 11 reads the up-date data representing the item data of the item pointed by the selecting cursor 70 from the weapon/protective gear table 23 and the read data is displayed (step S21).

Then the control unit 11 determines whether the power supplier item is selected (entered) or not (step S22).

If the control unit 11 determines that the power supplier item is not selected (entered), it further determines whether an instruction to move the selecting cursor 70 is input or not (step S23). If the instruction is input, the selecting cursor 70 moves (step S20), and the item data corresponding to the item pointed by the moved selecting cursor 70 is displayed (step S21).

When the player presses the enter button on the input section 3, the item pointed by the selecting cursor 70 is selected as the power supplier item (step S22). In response to the selection, the control unit 11 stores the item data of the selected power supplier item in the work area 12c (step S24).

Figure 10:
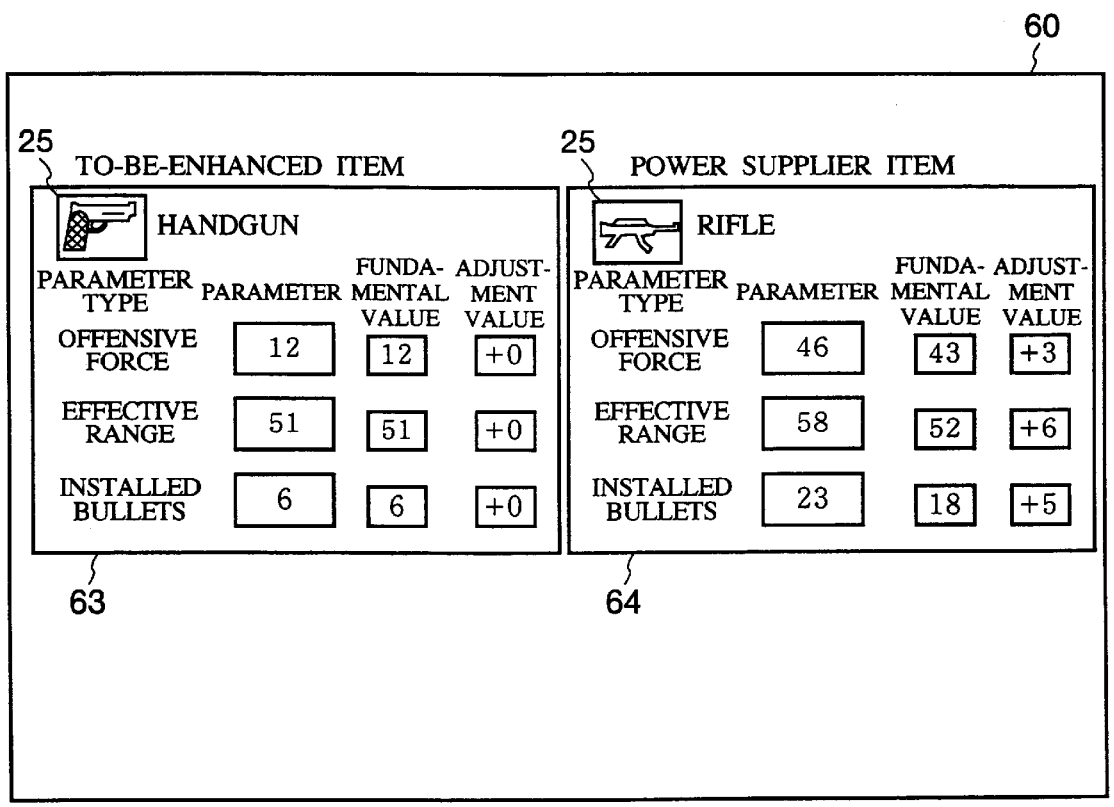

The control unit 11 displays the item data of the to-be-enhanced item on a to-be-enhanced item data display area 63 in the display area 60 and displays the item data of the power supplier item on a power supplier item data display area 64. The to-be-enhanced item data display area 63 and the power supplier item data display area 64 are placed side by side (step S25). FIG. 10 exemplifies a displayed screen when the handgun is selected as the to-be-enhanced item and a rifle is selected as the power supplier item.

Then, each of the adjustment values of the up-date data in the weapon/protective gear table 23 corresponding to the power supplier item is reset to 0, thus the parameters are updated (step S26).

Then, each of the adjustment values of the power supplier item stored in the work area 12c is added to corresponding adjustment value of the update data in the weapon/protective gear table 23 corresponding the to-be-enhanced item to update the adjustment values (step S27). Note that each of the adjustment value is 3-digit numeric data up to "999". The control unit 11 determines whether or not the updated adjustment value of the to-be-enhanced item is equal to or greater than "999" (step S28). If the adjustment value is over "999", the control unit 11 sets the adjustment value to "999" (step S29).

A new parameter is prepared by adding the updated adjustment value of the to-be-enhanced item to its fundamental value. The newly prepared parameter is set to the corresponding parameter of the update data in the weapon/protective gear table (step S30).

Then, the updated item data of the to-be-enhanced item and the updated item data of the power supplier item are displayed as shown in FIG. 11 (step S31).

Figure 12:
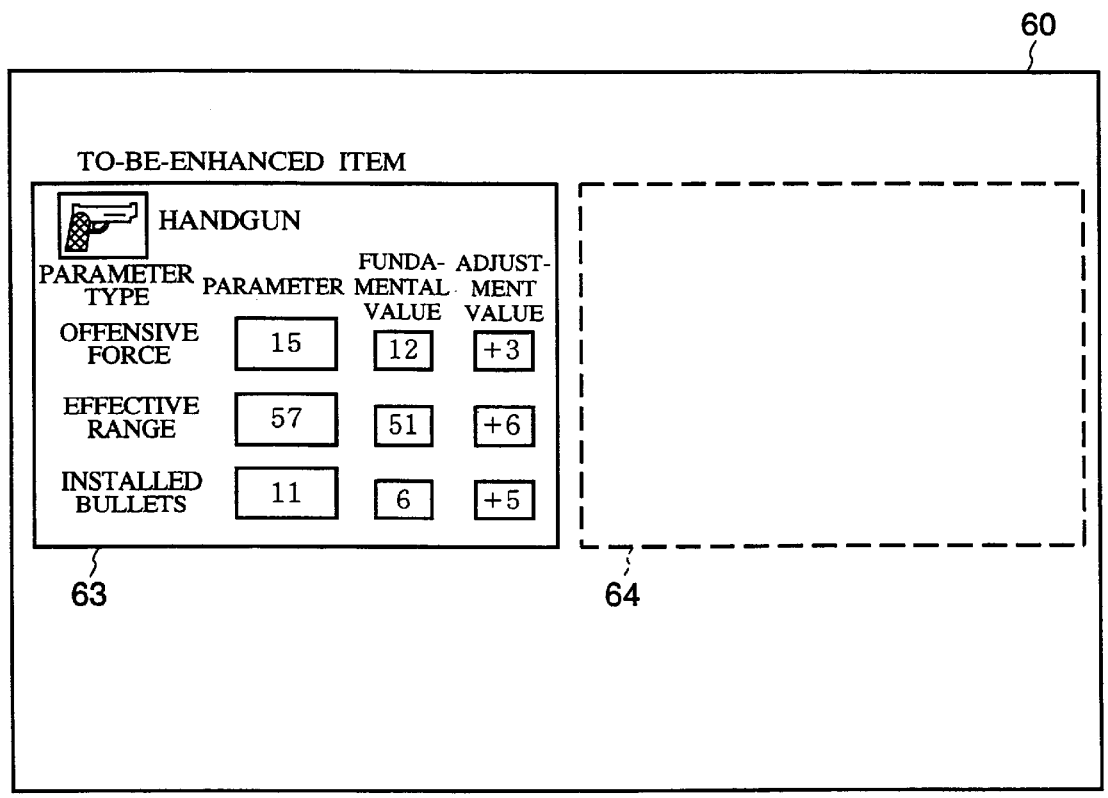

Then, the displayed item data of the power supplier item are deleted as shown in FIG. 12. (step S32).

Finally, the up-date data in the weapon/protective gear table 23 corresponding to the power supplier item are deleted, and the value of quantity in the item owned table 20 corresponding to the power supplier item is reduced only by 1 (step S33).

The item enhancement processing is completed in response to the player's operation such as pressing a cancel button on the input section 3.

The above described example of the item enhancement processing with reference to the FIGS. 9 to 12 shows the way to enhance weapon items. The protective gear items can likewise be enhanced in the same manner.

Thus, the player can customize his own weapon (protective gear) item so as to be more effective one utilizing another weapon (protective gear) item (i.e. the adjustment value of the parameters in the up-date data is variable). According to such processing, the player character steps ahead in the game story while "tuning up" his own weapons or protective gear to enhance them.

The player selects "DISPLAY ITEM" 55 from the menu screen shown in FIG. 6 so that the player character is equipped with the item enhanced by the above item enhancement processing. In response to the selection, the control unit 11 displays a list of the items owned by the player character on the display monitor 6. The player selects a desired item from the displayed list so that the player character is equipped with a selected item as one of his active items. When an inactive item is changed to an active item, the active item flag 240 of the up-date data in the weapon/protective gear table 23 corresponding to the item concerned is set to "1" from "0". On the contrary, when an active item is then changed to an inactive item, the active item flag F240 of the up-date data corresponding to the item concerned is reset to "0" from "1".

Battle mode processing executed by the control unit 11 in the video game apparatus according to the embodiment will now be described.

The player character is controlled by the player and the game story proceeds. When the player character meets enemy characters or reaches certain special stages in the game, a battle mode in which the player character fights with enemy characters is executed. The process of the battle mode is represented by a flowchart shown in FIG. 13.

When a battle starts, the control unit 11 obtains the parameters of the active items, that is, the parameters of the items each of whose active item flag is set to "1" of the up-date data in the weapon/protective gear table 23 (step S41).

The control unit 11 substitutes the obtained item parameters for a predetermined equation to calculate damages of the player character and the enemy characters (step S42).

The equation uses, for example, parameters of offensive force or defensive force for the active items or parameters for a battle situation, e.g. distance between the player character and the enemy character, to calculate how much damage the enemy character receives from the player character or how much damage the player character receives from the enemy character.

The parameters of the player character and the enemy character e.g. the stamina parameter varies in accordance with the calculation result in step S42 (step S43). When the enemy character is damaged, for example, the stamina parameter of the damaged enemy character is reduced in accordance with the degree of calculated damage. On the contrary, the stamina parameter of the player character is reduced in accordance with the degree of calculated damage degree when the player character receives damage.

When the control unit 11 detects that one of the player character and the enemy character has completely lost its stamina (i.e. the stamina parameter becomes 0), the control unit 11 determines that the battle finishes and terminates the battle mode processing (step S44).

If both the player character and the enemy character do not lose their stamina completely (i.e. the stamina parameters are not 0), the flow returns to step S41.

According to the embodiment described above, the player can enhance his own item by utilizing another item. Thus, the game will be a more enjoyable one because the item enhancement depends on the player's decision. Moreover, since each player has his own way of item enhancement, the game process may differ from player to player.

Figure 14:
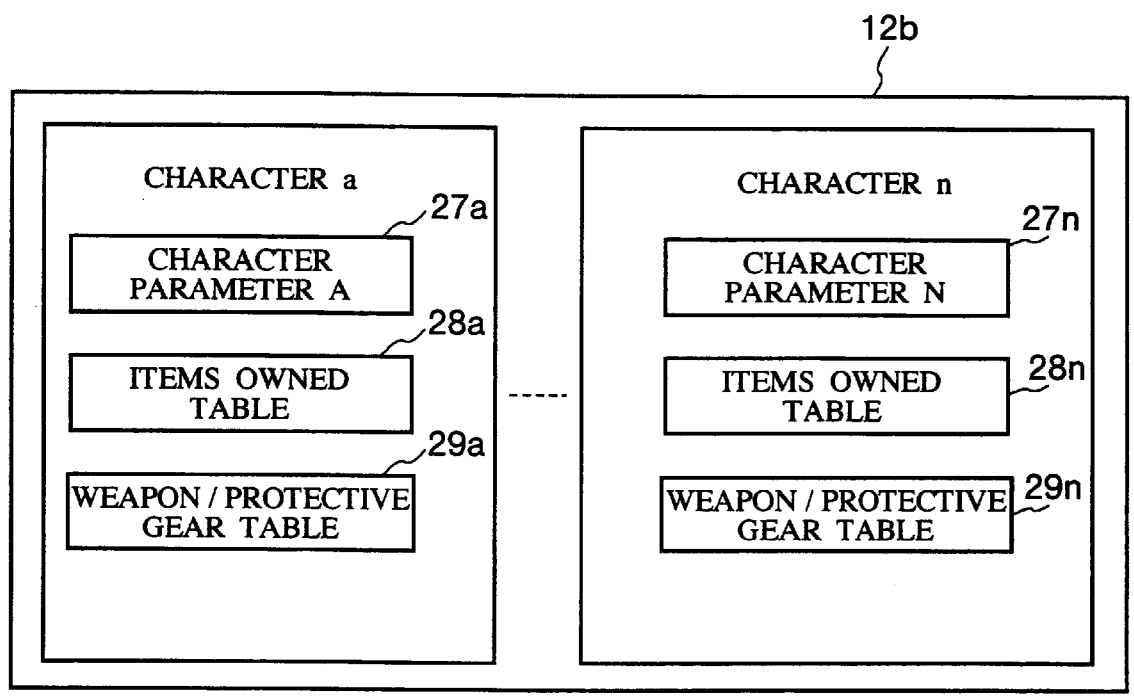
FIG. 14 is a diagram showing areas assigned to the RAM prepared for a plurality of characters.

The number of characters which can use the items is not limited to 1. A plurality of characters may use the items. In a case where plural characters which can use the items exist, the relational data storage area 12b in the RAM 12 has areas prepared for each character respectively as shown in FIG. 14. That is, the relational data storage area 12b has character parameter areas 27a, 27b, . . . , 27n for storing the parameters of each character, items owned table 28a, 28b , . . . 28n for storing data related to the items obtained by each character, and weapon/protective gear tables 29a, 19b, . . . , 29n for storing parameters assigned to weapon or protective gear items of the items registered in the items owned table 28a, 28b, . . . , 28n.

Figure 13:
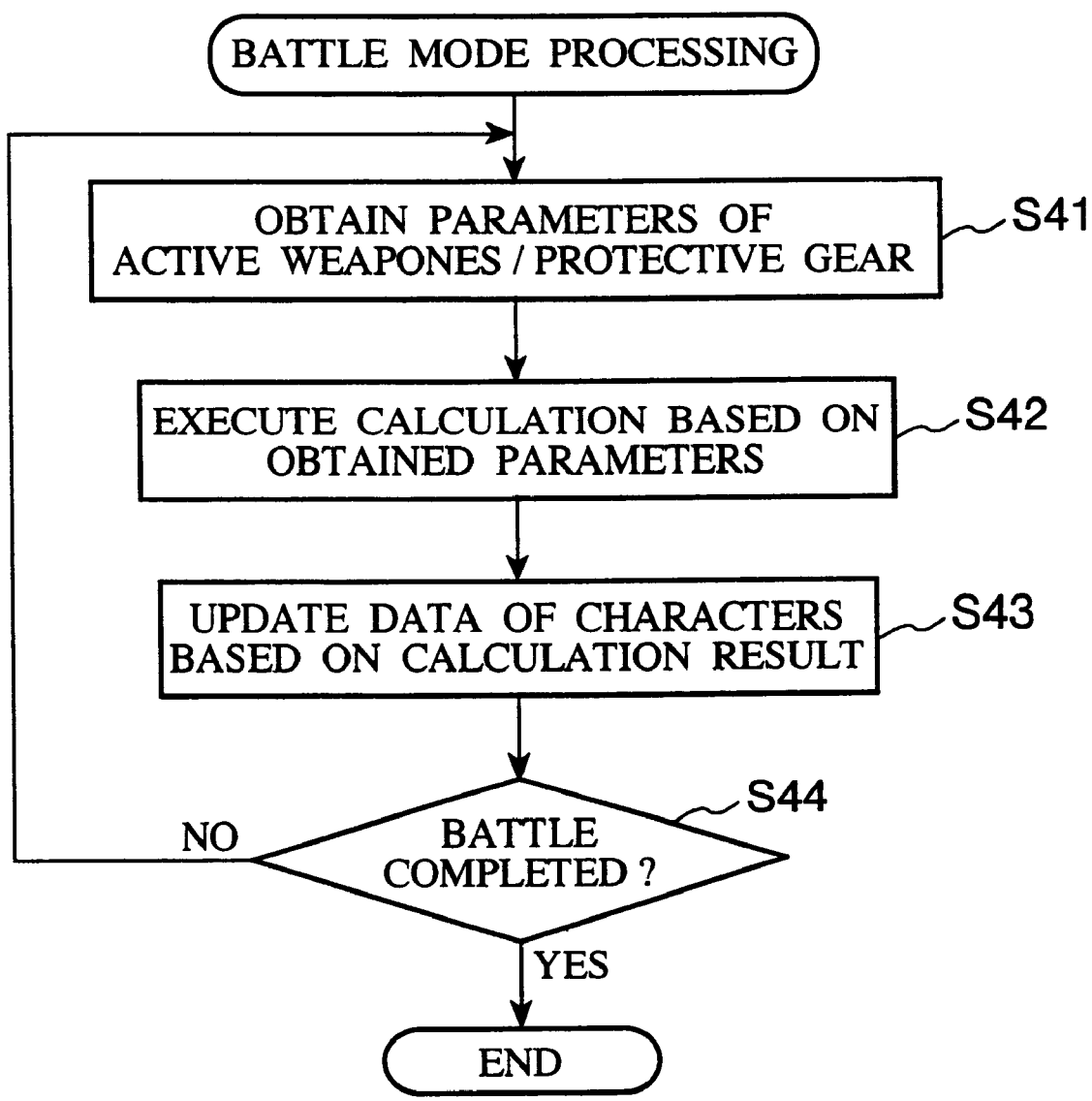
FIG. 13 is a flowchart for explaining fighting scene mode process in the video game.

In this case, the item enhancement processing shown in FIGS. 7 and 8 and the battle mode processing shown in FIG. 13 are executed for each character respectively during the game.

Each of the characters may have his adjustment value set to "0" when he obtains an item (i.e. initial adjustment value is 0). The initial adjustment value may also be a numeric value other than 0.

In the above embodiment, the sum of the fundamental value and the adjustment value represents the parameter of the item, and the to-be-enhanced item employs the sum of the adjustment values of two items as its new adjustment value, thus, the parameter is adjusted (corrected). The structure of the item values or a method of adjustment may be changed or modified arbitrary.

For example, a negative value may be used as the adjustment value. Each item value may consist of only one value. The sum of the item values of two items may be used as a new item value to adjust (correct) the parameters.

The product of the fundamental value by the adjustment value may be uses as the item value where the adjustment value is used as the coefficient, and the sum or the product of the adjustment values of two items may be used as a new item value to adjust (correct) the parameters. Other arbitrary ways to adjust the item values may be employed.

A platform apparatus for practicing the present invention is not limited to the above described video game apparatus 1. A general purpose computer such as a personal computer, a portable game device, an arcade game apparatus, or the like may be used as the platform apparatus.

A storage medium for containing programs or data to serve them to the device for executing the present invention is not limited to that of a CD-ROM 4. Any computer readable storage medium such as a magnetic storage medium, an optical storage medium, a semiconductor memory device, or the like may be used. Furthermore, the programs and data for realizing the present invention may be previously installed on a hard disk drive of a general purpose computer.

The programs and data necessary for realizing the present invention may be distributed in various ways i.e. it is not limited to a storage medium such as the CD-ROM 4. Those programs and data may be distributed via the network 100. In this case, a computer data signal embodied in a carrier wave is supplied to the video game apparatus from another device connected to the network 100. More precisely, the video game apparatus 1 send commands to another device via the communication interface 17 and the communication cable 99 to demand another device to send the computer data signal to the video game apparatus 1. The video game apparatus 1 receives the computer data signal and stores it in the RAM 12. Thus, the present invention may be realized in the video game apparatus 1 while using the programs and data stored in the RAM 12.

The ways for providing the programs and relational data necessary for realizing the present invention may be separated. For example, the programs may be distributed by the CD-ROM 4 in which case the CD-ROM drive 17 transfers the programs to the RAM 12, while the relational data may be distributed via the communication cable 99 connected to the network 100 from another device. Or, the relational data may be distributed by the CD-ROM 4 in which case the CD-ROM drive 16 transfers the relational data to the RAM 12, while the programs may be distributed via the communication cable 99 connected to the network 100 from another device. Or, the programs may be stored on a CD-ROM and the relational data may be stored on another CD-ROM.

The present invention can be embodied in any other specific form, without departing from the spirit and scope thereof. The above-described embodiments are referred to only for explanation and do not limit the present invention. The scope of the present invention is shown by the attached claims rather than by the embodiments. All modifications made within the meaning of an equivalent of the claims and the range of the claims are to be regarded to be within the scope of the present invention.

What is claimed is:

1. A video game apparatus for executing a video game including a character which can own a plurality of items having influences upon a game progress, said video game apparatus comprising:

copy means for copying said plurality of items and corresponding preset item values owned by said character from a first storage means to a second storage means;

designation means for designating a first item and a second item from said plurality of items stored in said second storage means in accordance with a predetermined input instruction;

reading means for reading item values of said first and second items designated by said designation means from said second storage means;

calculating means for calculating a new item value from the item values of the first and second items read by the reading means; and update means for updating said item value of said first item stored in said second storage means with the new item value calculated by the calculating means.

2. The video game apparatus according to claim 1, further comprising:

means for influencing the game progress when said character is instructed by the predetermined input instruction to use the item whose degree of influence corresponds to the new item value.

3. The video game apparatus according to claim 1, wherein said item value comprises a fundamental value and an adjustment value for adjusting said fundamental value, wherein said reading means reads adjustment values of said first and second items from said second storage means, wherein the calculating means calculates a new adjustment value using the read adjustment values, and wherein the updating means replaces the adjustment value of said first item with the new adjustment value calculated by the calculating means.

4. The video game apparatus according to claim 3, wherein a sum of the fundamental value and the adjustment value represents said item value, wherein said reading means reads the adjustment values of said first and second items from said second storage means, and wherein the calculating means adds the read adjustment values to each other.

5. The video game apparatus according to claim 1, further comprising:

means for deleting a combination of said second item and the item value thereof from a plurality of combinations of items and item values thereof stored in said second storage means when the item value of said first item is updated by said update means.

6. A video game apparatus for executing a video game including a character which can own a plurality of items having influences upon a game progress, said video game apparatus comprising:

means for displaying objects representing a first item and a second item designated by a predetermined input instruction from said plurality of items owned by the character, and for displaying item values corresponding to said designated first and second items;

means for adding said displayed item values corresponding to said first and second items to each other; and means for replacing said item value of said first item by a resultant value of the addition; and means for displaying only an object representing said first item and the item value thereof when the item value of said first item is replaced.

7. A video game apparatus comprising a storage device and a processing device for executing a video game including a character which can own a plurality of items having influences upon a game progress, said storage device including a first memory area configured to store a plurality of items and corresponding preset item values and configured to store programs for controlling the game progress, and including a second memory area configured to store the plurality of items and corresponding preset item values owned by said character which are copied from said first memory area, and in which said processing device:

(1) controls the game progress in accordance with the programs stored in said first memory area and input instructions, and exerts an influence upon the game progress when said character is instructed by a predetermined input instruction to use an item whose degree of influence depends on an item value from another item stored in said second storage area; and (2) reads item values corresponding to two items of the plurality of items stored in said second memory area in accordance with the predetermined input instruction, modifies one of the read item values based on the other item value, and stores the modified value in said second memory area as a new item value of said item.

8. A method of executing a video game including a character which can own a plurality of items having influences upon a game progress, said method comprising:

copying the plurality of items and corresponding preset item values owned by said character from a first memory area to a second memory area;

designating a first item and a second item from the plurality of items stored in said second memory area in accordance with a predetermined input instruction;

reading item values of said first and second items designated by said designating step from said second memory area;

calculating a new item value from the item values of the first and second items read in the reading step; and updating the item value of said first item stored in said second memory area with the new item value calculated in the calculating step.

9. The method of executing the video game according to claim 8, further comprising:

exerting influence upon the game progress when said character is instructed by the predetermined input instruction to use the item whose degree of the influence corresponds to the new item value.

10. The method of executing the video game according to claim 8, wherein said item value comprises a fundamental value and an adjustment value for adjusting said fundamental value, wherein the reading step reads the adjustment values of said first and second items from said second memory area, wherein the calculating step calculates a new adjustment value using the read adjustment values, and wherein the updating step replaces the adjustment value of said first item with the new adjustment value.

11. The method of executing the video game according to claim 8, further comprising:

deleting a combination of said second item and the item value thereof from a plurality of combinations of items and item values thereof stored in said second memory area when the item value of said first item is replaced in said updating step.

12. A method of executing a video game including a character which can own a plurality of items having influences upon a game progress, said method comprising:

displaying objects representing a first item and a second item designated by a predetermined input instruction from said plurality of items owned by said character and for displaying item values corresponding to said designated first and second items;

adding said displayed item values corresponding to said first and second items to each other;

replacing said item value of said first item by a resultant value of the addition; and displaying only an object representing said first item and the item value thereof when the item value of said first item is replaced.

13. A computer program product for causing a computer to execute a video game including a character which can own a plurality of items having influences upon a game progress, said computer program product comprising:

a first computer code configured to copy the plurality of items and corresponding preset item values owned by said character from a first memory area to a second memory area;

a second computer code configured to designate a first item and a second item from the plurality of items stored in said second memory area in accordance with a predetermined input instruction;

a third computer code configured to read item values of said first and second items designated by the second computer code from said second memory area;

a fourth computer code configured to calculate a new item value from the item values of the first and second items read by the third computer code; and a fifth computer code configured to update the item value of said first item stored in said second memory area with the new item value calculated by the fourth computer code.

14. The computer program product according to claim 13, further comprising:

a sixth computer code configured to exert influence upon the game progress when said character is instructed by the predetermined input instruction to use the item whose degree of the influence depends on the new item value.

15. The computer program product according to claim 13, wherein said item value comprises a fundamental value and an adjustment value for adjusting said fundamental value, wherein the third computer code reads the adjustment values of said first and second items, wherein the fourth computer code calculates a new adjustment value using the read adjustment values, and wherein the fifth computer code replaces the adjustment value of said first item with the new adjustment value.

16. The computer program product according to claim 15, wherein a sum of the fundamental value and the adjustment value represents said item value, wherein the third computer code reads the adjustment values of said first and second items from said memory area, and wherein the fourth computer code adds the read adjustment values to each other.

17. The computer program product according to claim 13, further comprising:

a sixth computer code configured to delete a combination of said second item and the item value thereof from a plurality of combinations of items and item values thereof stored in said second memory area when the item value of said first item is updated by the fifth computer code.

18. A computer program product for causing a computer to execute a video game including a character which can own a plurality of items having influences upon a game progress, said computer program product comprising:

a first computer code configured to display objects representing a first item and a second item designated by a predetermined input instruction from said plurality of items owned by said character, and configured to display item values corresponding to said designated first and second items;

a second computer code configured to add said displayed item values corresponding to said first and second items to each other;

a third computer code configured to replace said item value of said first item by a resultant value of the addition; and a fourth computer code configured to display only an object representing said first item and the item value thereof when the item value of said first item is replaced.

19. A computer data signal embodied in a carrier wave for causing a computer to execute a video game including a character which can own a plurality of items having influences upon a game progress, said computer data signal causing the computer to perform the steps of:

copying the plurality of items and corresponding preset item values owned by said character from a first memory area to a second memory area;

designating a first item and a second item from the plurality of items stored in said second memory area in accordance with a predetermined input instruction;

reading item values of said first and second items designated by designating step from said second memory area;

calculating a new item value from the item values of the first and second items read by the reading step;

updating the item value of said first item stored in said second memory area using the new item value calculated by the calculating step.

20. A computer data signal embodied in a carrier wave for causing a computer to execute a video game including a character which can own a plurality of items having influences upon a game progress, said computer data signal causing the computer to perform the steps of:

displaying objects representing a first item and a second item designated by a predetermined input instruction from said plurality of items owned by said character, and displaying item values corresponding to said designated first and second items;

adding said displayed item values corresponding to said first and second items to each other;

replacing said item value of said first item by a resultant value of the addition; and displaying only an object representing said first item and the item value thereof when the item value of said first item is replaced.

* * * * *

UNITED STATES PATENT AND TRADEMARK OFFICE
CERTIFICATE OF CORRECTION

PATENT NO.       : 6,306,033 B1
DATED            : October 23, 2001
INVENTOR(S)      : Takayuki Niwa et al.

It is certified that error appears in the above-identified patent and that said Letters Patent is hereby corrected as shown below:

<u>Column 7,</u>
Line 19, change "1200" to -- 100 --.

Signed and Sealed this

Nineteenth Day of March, 2002

Attest:

JAMES E. ROGAN
Attesting Officer         *Director of the United States Patent and Trademark Office*